(12) United States Patent
Gallagher, Jr. et al.

(10) Patent No.: US 10,661,881 B2
(45) Date of Patent: May 26, 2020

(54) FLIGHT DECK SECURITY POCKET DOOR DECOMPRESSION VENTING AND CREW ESCAPE SYSTEM

(71) Applicant: THE BOEING COMPANY, Chicago, IL (US)

(72) Inventors: Timothy P. Gallagher, Jr., Lake Stevens, WA (US); James J. Kunda, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 214 days.

(21) Appl. No.: 15/810,631

(22) Filed: Nov. 13, 2017

(65) Prior Publication Data
US 2019/0144098 A1 May 16, 2019

(51) Int. Cl.
| | | |
|---|---|---|
| B64C 1/14 | (2006.01) | |
| E06B 7/32 | (2006.01) | |
| E05C 3/04 | (2006.01) | |
| E05D 15/06 | (2006.01) | |
| E05B 47/00 | (2006.01) | |
| E05C 19/00 | (2006.01) | |
| E06B 5/12 | (2006.01) | |
| E05D 11/10 | (2006.01) | |

(Continued)

(52) U.S. Cl.
CPC .......... *B64C 1/1469* (2013.01); *B64C 1/1461* (2013.01); *E05B 47/0001* (2013.01); *E05B 47/0603* (2013.01); *E05B 51/023* (2013.01); *E05B 65/0847* (2013.01); *E05C 3/04* (2013.01); *E05C 3/043* (2013.01); *E05C 19/001* (2013.01); *E05C 19/002* (2013.01); *E05D 3/02* (2013.01); *E05D 11/1007* (2013.01); *E05D 15/0604* (2013.01); *E06B 3/50* (2013.01); *E06B 5/12* (2013.01); *E06B 7/32* (2013.01); *B64C 2001/009* (2013.01); *E05B 47/0002* (2013.01); *E05Y 2900/502* (2013.01)

(58) Field of Classification Search
CPC ........ B64C 1/1469; B64C 1/1461; E06B 5/12
USPC ......... 49/169, 381, 394, 453, 454, 158, 159, 49/141
See application file for complete search history.

(56) References Cited

U.S. PATENT DOCUMENTS

| | | | |
|---|---|---|---|
| 6,397,522 B1 * | 6/2002 | Nussbaum | ............ E05B 53/003 49/127 |
| 6,422,287 B1 * | 7/2002 | Wilke | ..................... E05D 15/58 160/195 |

(Continued)

*Primary Examiner* — Timothy D Collins
*Assistant Examiner* — Chunhong Zhang
(74) *Attorney, Agent, or Firm* — Marshall, Gerstein & Borun LLP

(57) ABSTRACT

A door assembly includes a door panel having a first pair of bearings secured to a top portion of the door panel and a second pair of bearings secured to a bottom portion of the door panel. A wall having an opening which extends through the wall wherein a first rail track extends along a first end portion of the opening having a first opening and a second rail track extends along a second end portion of the opening having a second opening. At least one hinge blocking assembly includes a first bracket connected to the wall and a second bracket wherein the second bracket is rotatably mounted to the first bracket about a fixed axis of rotation defined by the at least one hinge blocking assembly wherein with the second bracket in a first position the second bracket extends away from the first bracket.

20 Claims, 8 Drawing Sheets

(51) Int. Cl.
*E05B 65/08* (2006.01)
*E05B 47/06* (2006.01)
*E06B 3/50* (2006.01)
*E05D 3/02* (2006.01)
*E05B 51/02* (2006.01)
*B64C 1/00* (2006.01)

(56) References Cited

U.S. PATENT DOCUMENTS

| | | | |
|---|---|---|---|
| 6,526,695 B1* | 3/2003 | Nguyen | E05D 7/1005 49/141 |
| 6,702,230 B2 | 3/2004 | Movsesian et al. | |
| 7,441,726 B2 | 10/2008 | Melberg et al. | |
| 10,280,678 B1* | 5/2019 | Rendon, Jr. | E06B 3/5072 |
| 2006/0150512 A1* | 7/2006 | Heithe | E05B 65/10 49/141 |
| 2012/0159851 A1* | 6/2012 | Seymour | E05D 15/58 49/177 |

* cited by examiner

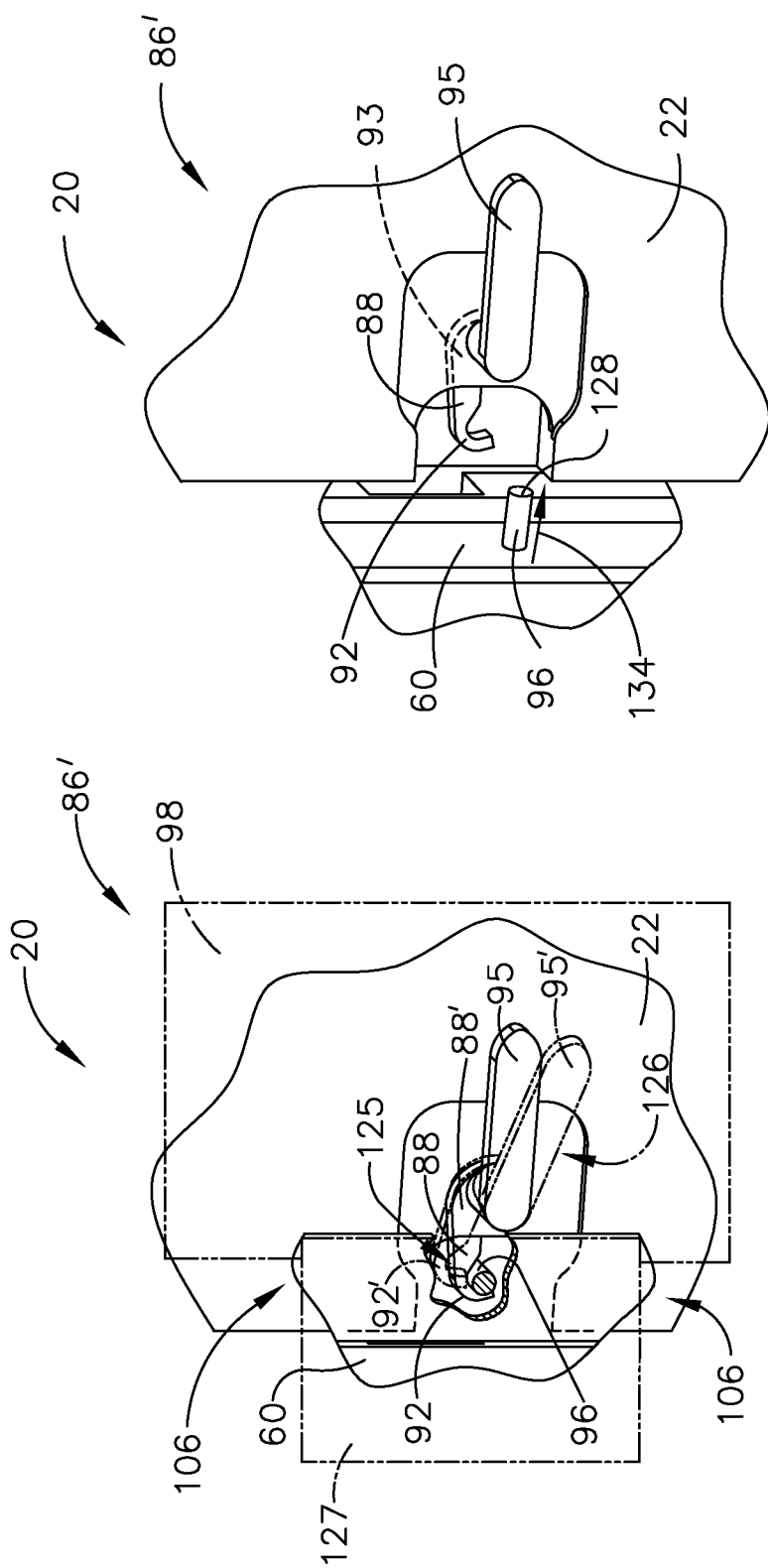

FLIGHT DECK SECURITY POCKET DOOR DECOMPRESSION VENTING AND CREW ESCAPE SYSTEM

FIELD

This disclosure relates to a door assembly and a locking mechanism and more particularly to a door assembly and locking mechanism that provides a secure closed position for the door and permits release of the door from the closed position such that the door can be moved in different directions to an open position.

BACKGROUND

Traditional aircraft cockpit doors which separate the flight deck from a cabin of the aircraft often operate on hinges that allow the door to swing open and swing closed. The full travel of the hinged swinging door occupies much space within a limited space of the inside of an aircraft in permitting ingress and egress of authorized personnel with respect to the flight deck.

A sliding pocket door can be employed, instead of the hinged swinging door, which demands much less use of space with opening and closing of the sliding door within the limited space within the aircraft. However, aircraft doors are required to account for potential decompression events. A sliding pocket door only moves laterally along their tracks and does not respond to move to an open position in response to a decompression event which applies a force on the door in a direction transverse to the direction of travel of a sliding door and the tracks upon which the sliding door travels.

There is a need to provide a door for an opening that in operation permits authorized personnel to travel through the opening, for example, between the flight deck and the cabin such that opening and closing of the door does not take up much of the limited space available within the aircraft. At the same time, there is a need for the door to be able to respond to a decompression event and provide an open air passageway through the opening or passageway which the door secures. In addition, there is a need to have a locking mechanism which permits securement of the door and release of the door from a closed position to provide authorized personnel to travel through the passageway and to provide the door to be released to an open position responsive to a decompression event to provide an air passageway.

SUMMARY

An example includes a door assembly which includes a door panel having a first pair of bearings secured to and positioned spaced apart along a top portion of the door panel and a second pair of bearings secured to and positioned spaced apart along a bottom portion of the door panel. The door assembly further includes a wall having an opening which extends through the wall. A first rail track extends along a first end portion of the opening with a first opening defined by the first rail track positioned on a first side of the first rail track, such that with the first pair of bearings aligned with the first rail track and the door panel in a closed position relative to the opening a first bearing of the first pair of bearings is aligned with the first opening. The door assembly further includes second rail track extends along a second end portion of the opening with a second opening defined by the second rail track positioned on a first side of the second rail track, such that with the second pair of bearings aligned with the second rail track and the door panel in a closed position relative to the opening a first bearing of the second pair of bearings is aligned with the second opening. Additionally door assembly includes at least one hinge blocking assembly which includes a first bracket connected to the wall and a second bracket wherein the second bracket is rotatably mounted to the first bracket about a fixed axis of rotation defined by the at least one hinge blocking assembly wherein with the second bracket in a first position the second bracket extends away from the first bracket.

An example includes a locking mechanism for a door panel to be positioned within and out of blocking relationship with an opening defined by a wall. The locking mechanism includes a deadbolt having a curved configuration with the deadbolt rotatably connected to the wall and a locking bracket connected to the door panel. The locking bracket extends from the door panel in an angular direction with respect to a plane of the door panel to a distal end of the locking bracket positioned spaced apart from the door panel. With the door panel in a closed position relative to the opening and the deadbolt in a first position, the locking bracket is positioned extending through the curved configuration of the deadbolt. The deadbolt is in blocking relationship with the locking bracket blocking the door panel from moving in a direction along a plane of the door panel and the deadbolt and the locking bracket are not in blocking relationship in a direction along the locking bracket. With the door panel in the closed position relative to the opening and the deadbolt in a second position the deadbolt is not in blocking relationship with the locking bracket permitting the door panel to move in a direction along a plane of the door panel.

An example includes a locking mechanism for a door panel to be positioned within and out of blocking relationship with an opening defined by a wall includes a deadbolt having a curved configuration with the deadbolt rotatably connected to the door panel. At least one hinge blocking assembly, which includes a first bracket connected to the wall and a second bracket rotatably mounted to the first bracket about a fixed axis of rotation defined by the at least one hinge blocking assembly. A locking bracket is connected to a blocking plate with the blocking plate connected to the second bracket and the locking bracket extends from the second bracket in an angular direction relative to a plane of the second bracket to a distal end spaced apart from the blocking plate. With the door panel in a closed position relative to the opening of the wall, the second bracket in a first position with the blocking plate overlies at least a portion of the door panel. With deadbolt positioned in a first position, the locking bracket extends through the curved configuration of the deadbolt and the locking bracket is in blocking relationship to the deadbolt and blocks movement of the door panel in a direction along the plane of the door panel. The locking bracket and the deadbolt are not in blocking relationship in a direction along the locking bracket. With the door panel in the closed position relative to the opening and the deadbolt in a second position the deadbolt is not in blocking relationship with the locking bracket permitting the door panel to move in a direction along a plane of the door panel.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 9 is a partially broken away view of a second embodiment of a locking mechanism wherein a deadbolt is rotatably connected to the door panel and a locking bracket connected to a second bracket of a hinge blocking assembly is in blocking relationship to the deadbolt with the deadbolt in a first position preventing the door panel from sliding to an open position and the deadbolt in a second position in a non-blocking relationship with respect to the locking bracket permitting the door panel to slide to an open position; and FIG. 10 is the view of FIG. 9, wherein the door panel is swinging open with the locking bracket of the second bracket of the hinge blocking assembly slid out of engagement with the deadbolt wherein the deadbolt is in the first position of FIG. 9.

DESCRIPTION

Figure 1:
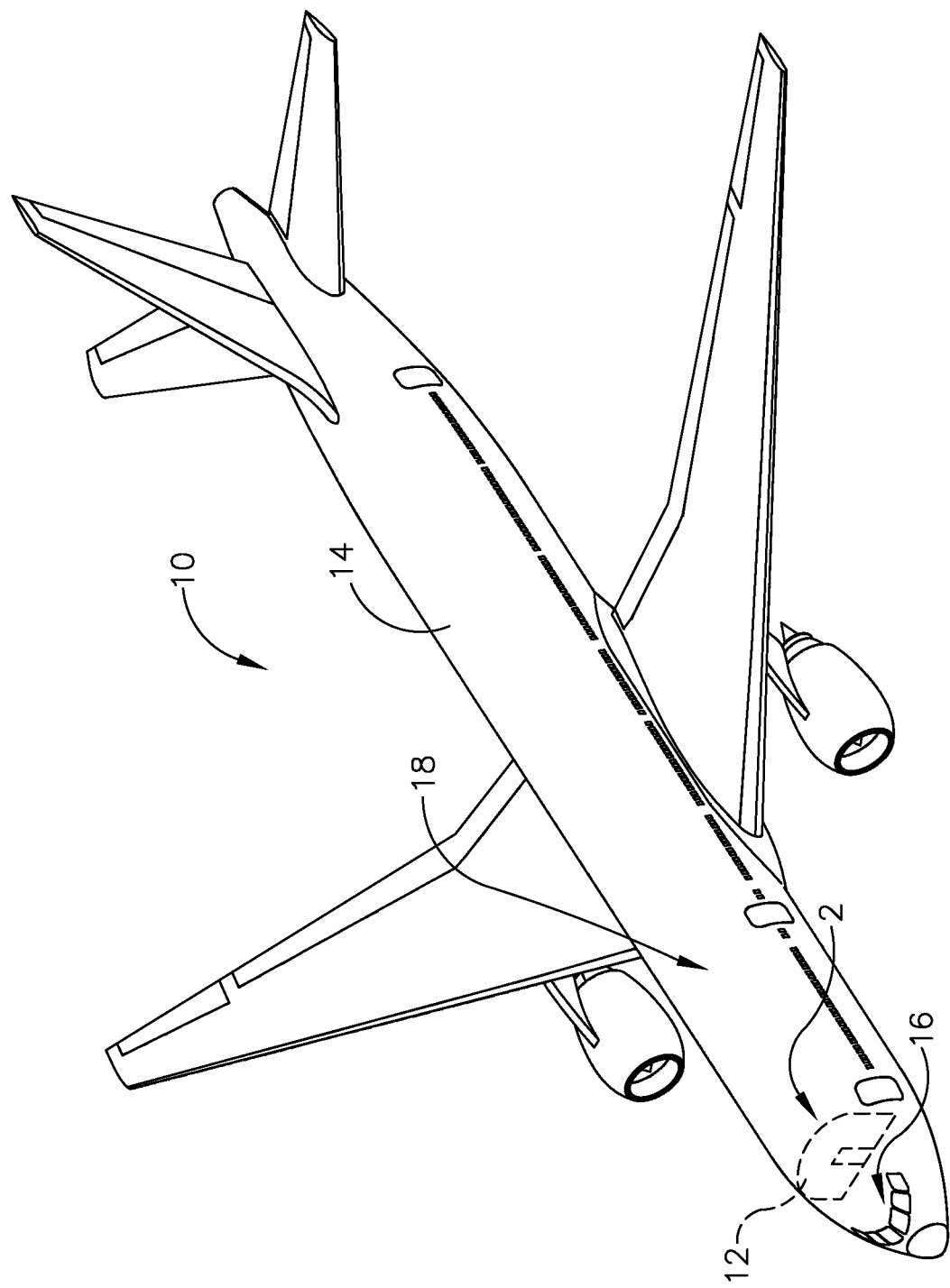
FIG. 1 is a top perspective view of an aircraft.

In referring to FIG. 1, aircraft 10 has a partition or wall 12, designated in location 2, which is positioned within fuselage 14. Wall 12 separates flight deck 16, which accommodates the personnel responsible for the operation of aircraft 10, from cabin 18 which accommodates passengers of aircraft 10. Often partition or wall 12 is constructed of very strong material such as for example ballistic resistant materials. An opening or passageway in wall 12 is provided which permits ingress and egress of authorized personnel involved in the operation of aircraft 10 with respect to flight deck 16. The passageway or opening between flight deck 16 and cabin 18 is secured with a door assembly which closes off flight deck 16 from cabin 18 and further secures flight deck 16 from unauthorized personnel and is similarly constructed of very strong material such that used in the construction of wall 12.

As discussed earlier, a door that is in a hinged relationship related to wall 12, occupies a significant amount of space within a restricted area within fuselage 14 with fully swinging the door between a fully open and a closed position. With using a pocket door instead, the amount of space needed to open and close the door is reduced, however, a pocket door does not meet the standards needed to accommodate a decompression event that could occur in flight deck 16. An occurrence of a decompression event in flight deck 16 causes a force to be applied in a transverse direction relative to the door in a direction toward flight deck 16 of aircraft 10. However, based on the construction of the pocket door extending in a direction across fuselage 14, the force applied to the pocket door will not move the door to a full open position so as to provide an optimum flow path for pressure equalization between cabin 18 and flight deck 16.

As will be discussed herein, a door assembly will operate to secure the opening or passageway through the partition or wall 12 positioned between cabin 18 and flight deck 16. The opening or passageway will permit the traffic of authorized personnel to ingress and egress with respect to the flight deck 16 and not unduly occupy limited available space within fuselage 14. The door assembly to be discussed herein will utilize a pocket door arrangement which can be locked and unlocked from flight deck 16 side of the door. This will permit secure transit of authorized personnel between cabin 18 side and flight deck 16 side of the pocket door and at the same time not take up too much of the limited space within fuselage 14 with the opening and closing of the door in the passageway. Additionally, the door assembly will also operate as a hinged door that will swing open as needed to provide an optimum flow path should flight deck 16 experience a major decompression event.

Figure 2:
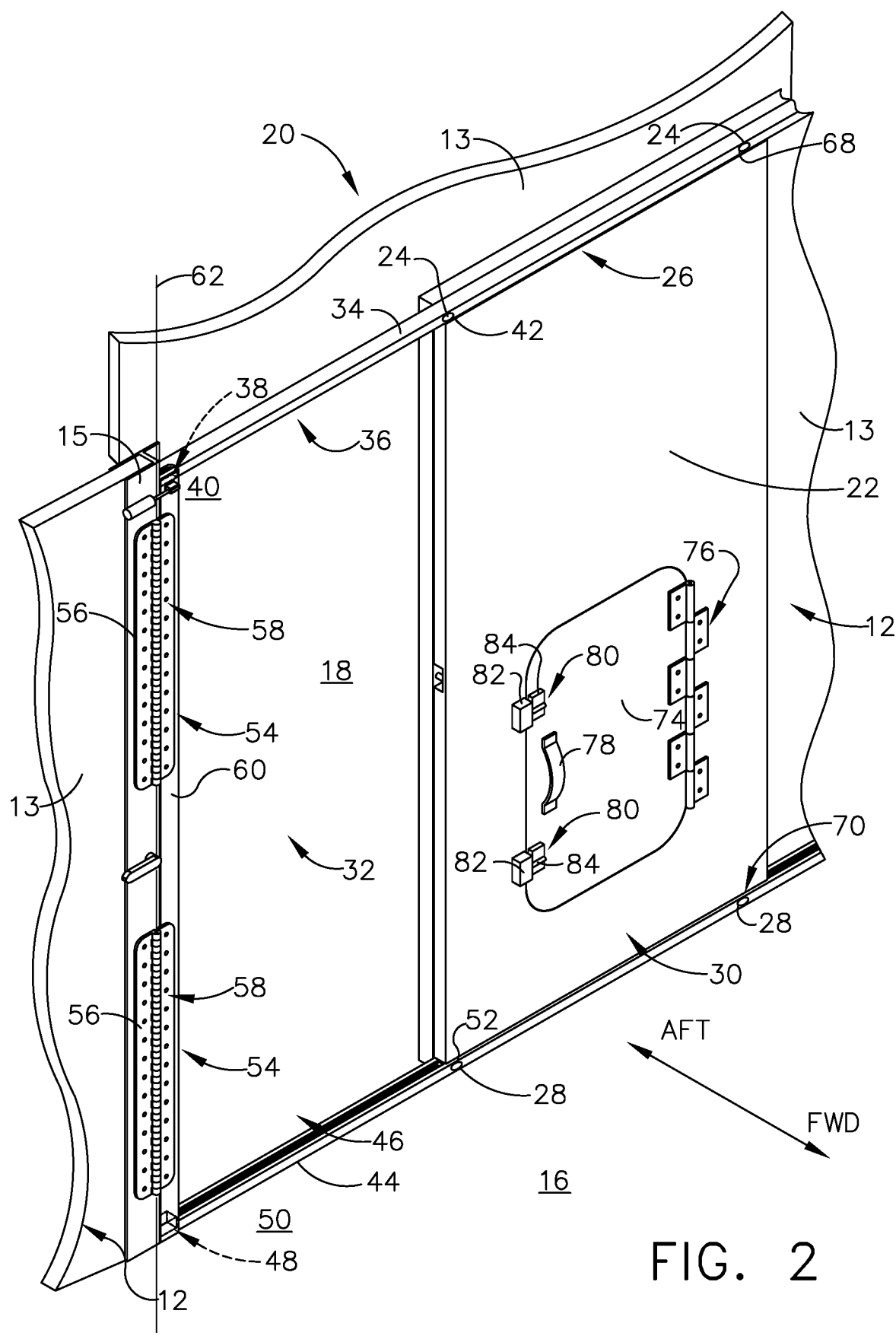
FIG. 2 is perspective view of a door assembly, at a location designated as 2 in FIG. 1, which in this example is positioned between a cabin and flight deck of the aircraft, with the door in a slid open position.

In referring to FIG. 2, wall 12 is shown separating cabin 18 and flight deck 16 and indicator arrows show the direction of aft and forward within aircraft 10 wherein aft is indicated by AFT and forward is indicated by FWD. When referring to wall 12 in this disclosure, wall 12 includes wall structure 13 and any frame structure 15 associated with wall structure 13. In this example, door assembly 20 includes door panel 22 having a first pair of bearings 24 secured to and positioned spaced apart along top portion 26 of door panel 22 and second pair of bearings 28 secured to and positioned spaced apart along bottom portion 30 of door panel 22. Wall 12 has passageway or opening 32 which extends through wall 12.

Figure 3:
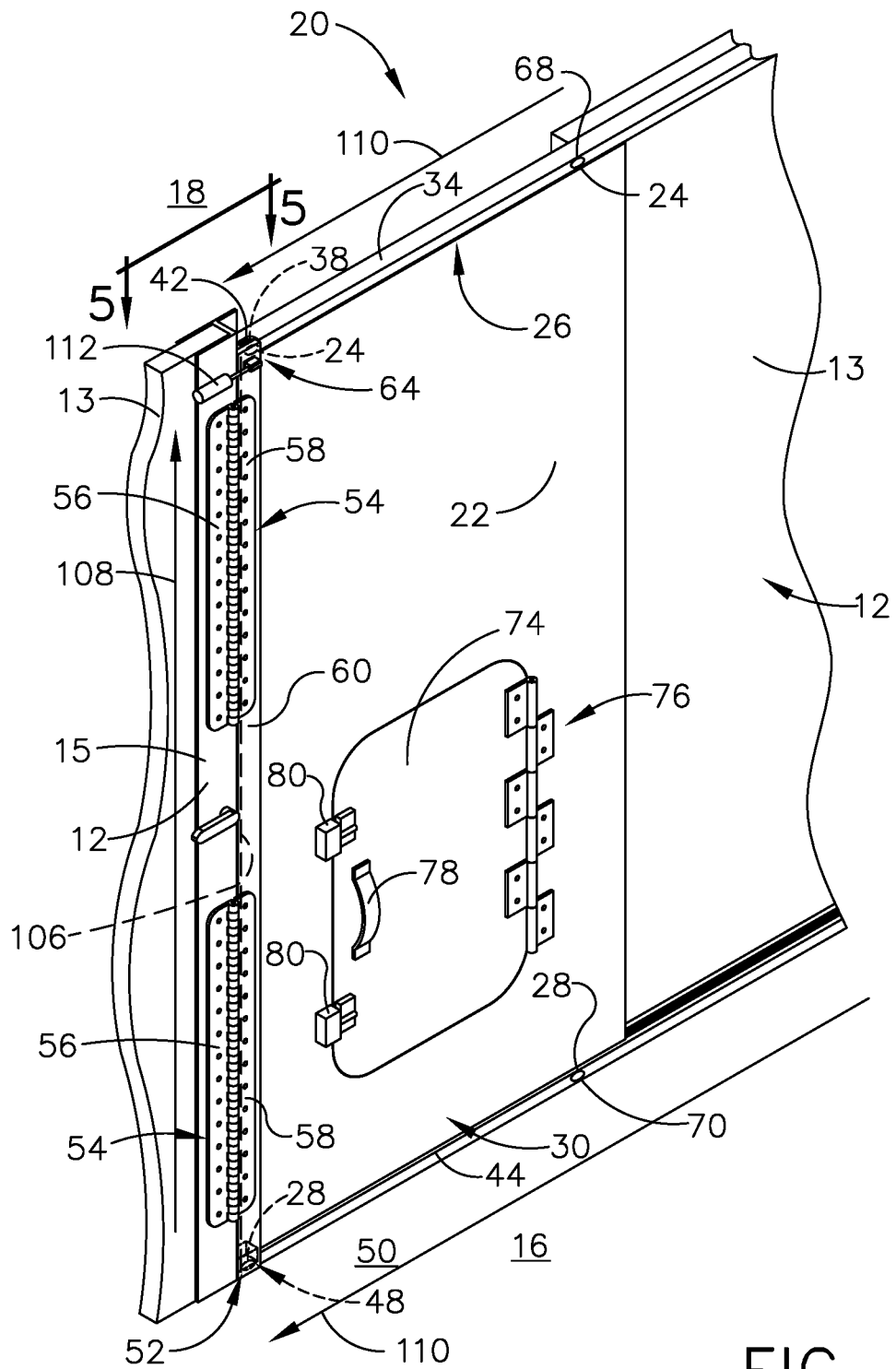
FIG. 3 is the door assembly in FIG. 2 in a slid closed position.
Figure 4:
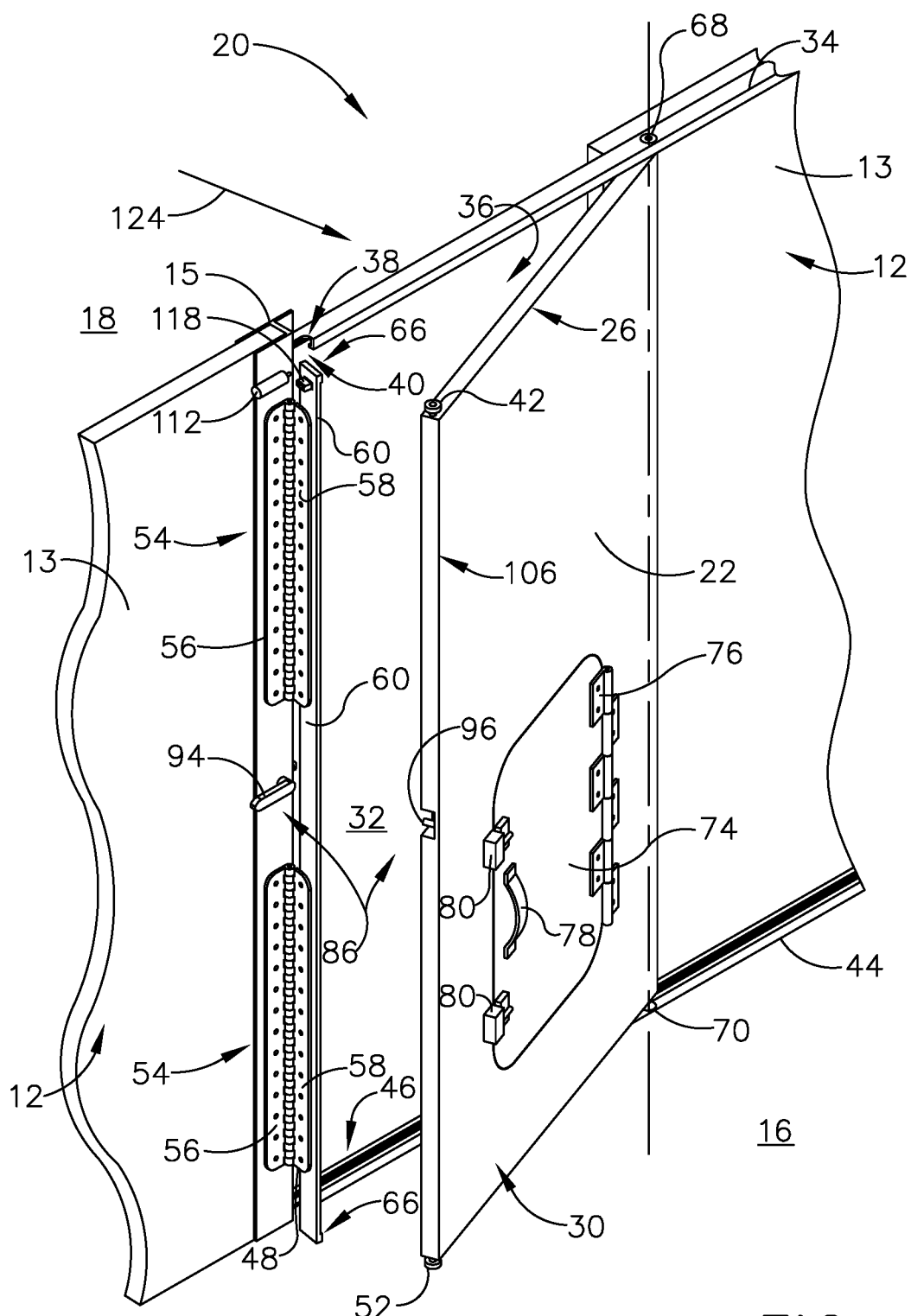
FIG. 4 is the door assembly in FIG. 3 which has been rotated open from the closed position.
Figure 5:
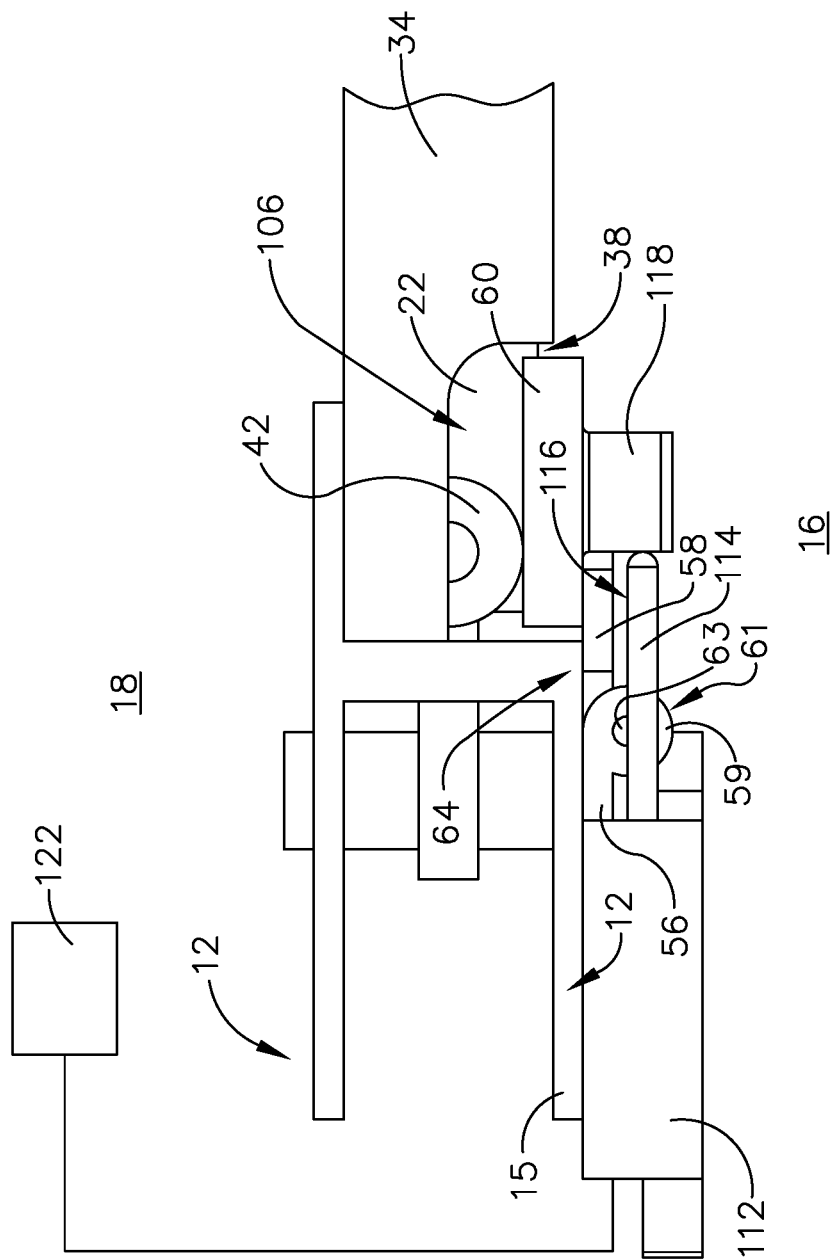
FIG. 5 is a schematic partial top plan view as seen along line 5-5 of the door assembly in the closed position as shown in FIG. 3.

In referring to FIGS. 2 and 5, first rail track 34 extends along first end portion 36 of opening 32 with first opening 38 defined by first rail track 34 positioned on first side 40, otherwise referred to as flight deck 16 side, of first rail track 34. With first pair of bearings 24 aligned with first rail track 34 and door panel 22 in a closed position relative to opening 32, as seen in FIG. 3, first bearing 42 of first pair of bearings 24 is aligned with first opening 38, as seen in FIG. 5. Similarly as above described for first rail track 34, second rail track 44 extends along second end portion 46 of opening 32, as seen in FIG. 2, with second opening 48 defined by the second rail track 44 positioned on first side 50, otherwise referred to as flight deck 16 side, of second rail track 44, such that with second pair of bearings 28 aligned with second rail track 44 and door panel 22 in closed position relative to opening 32, as seen in FIG. 3, first bearing 52, as seen in FIGS. 3 and 4, of second pair of bearings 28 is aligned with second opening 48, as similarly shown with respect to first bearing 42 of first pair of bearings 24 and first opening 38 shown in FIG. 5.

At least one hinge blocking assembly 54 includes first bracket 56 connected to wall 12. In this example as described earlier, frame 15 is inclusive of wall 12. Second bracket 58, in this example, includes blocking plate 60 secured to second bracket 58. Second bracket 58 is rotatably mounted to first bracket 56 about fixed axis of rotation 62, as seen in FIG. 2, and defined by the at least one hinge blocking assembly 54.

In this example, at least one hinge blocking assembly 54, as seen in FIG. 5, includes first bracket 56, second bracket 58 and a knuckle assembly 61 (not fully shown). Portion 59 which originates from first bracket 56 and another portion (not shown) which originates from second bracket 58 forms knuckle assembly 61 through which pin 63 is inserted wherein first and second brackets 56 and 58 are permitted to be able to rotate relative to one another. With second bracket 58 in first position 64, as seen in FIG. 5, second bracket 58 extends away from first bracket 56 and wall 12. Second bracket 58 is secured to blocking plate 60 and with second bracket 58 in first position 64 blocking plate 60 extends across at least one of: first opening 38 in blocking relationship to first bearing 42 of first pair of bearings 24 with respect to first opening 38 with door panel 22 in the closed position, as seen in FIG. 3, relative to opening 32, as seen in FIG. 2, and second opening 48, as seen in FIGS. 2 and 3, similarly structured as shown for first opening 38 seen in FIG. 5, in blocking relationship to first bearing 52 of second pair of bearings 28 with respect to second opening 48 similarly shown in FIG. 5 with respect to second bracket 58 in first position 64 with blocking plate 60 in blocking relationship to first bearing 42, with door panel 22 in closed position relative to opening 32.

In the example, shown in FIGS. 2-4, at least one hinge blocking assembly 54 includes two spaced apart assemblies 54. Further in this example, second bracket 58 has blocking plate 60 secured to second bracket 58 and second bracket 58 and blocking plate 60 extend along opening 32. With second bracket 58 in first position 64, blocking plate 60 is positioned in blocking relationship with respect to, in this example, both of first bearing 42 of first pair of bearings 24 at first opening 38 and first bearing 52 of second pair of bearings 28 at second opening 48. With second bracket 58 in first position 64, blocking plate 60 maintains first bearing 42 and first bearing 52 from moving out of first opening 38 and second opening 48, respectively.

Figure 6:
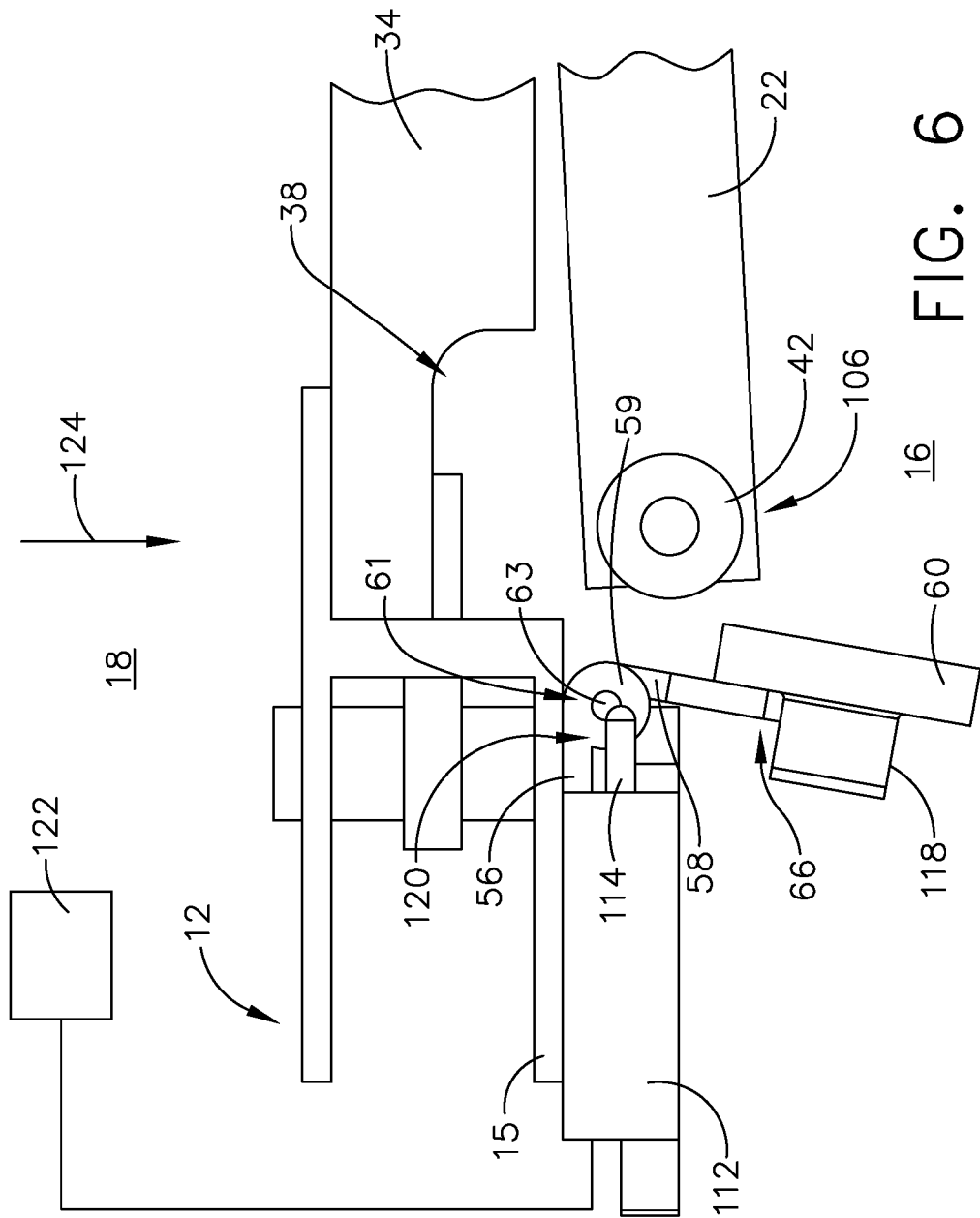
FIG. 6 is a schematic partial top plan view of FIG. 5 with the door rotating to an open position as shown for example in FIG. 4.

Door panel 22, with first pair of bearings 24 aligned with first rail track 34 and second pair of bearings 28 aligned with second rail track 44, can operate as a pocket door in that it can be slid between open position as seen in FIG. 2 to a closed position as seen in FIG. 3 and reciprocated between these positions so as to accommodate personnel traffic moving through passageway or opening 32. As will be discussed in further detail herein, door panel 22 is also able to move from the closed position as seen in FIG. 3 to a swinging open position as seen in FIG. 4. Swinging of door panel 22 occurs with second bracket 58 moved to second position 66, as seen in FIG. 6, thus moving in this example blocking plate 60 out of blocking position of first bearing 42 and first bearing 52 with respect to first opening 38 and second opening 48, respectively. With a blocking arrangement removed from second bracket 58, to be discussed in more detail below and with a force applied to door panel 22 such as from a decompression event occurring in flight deck 16, door panel 22 is pushed toward flight deck 16 and second bearing 68 of first pair of bearings 24 and second bearing 70 of second pair of bearings 28 being aligned with first rail track 34 and second rail track 44 respectively act as a hinge about which door panel 22 would rotate as seen in FIG. 4 permitting air flow to pass through opening 32 from cabin 18 from the decompression event.

Wall 12 is positioned within fuselage 14 of aircraft 10 separating flight deck 16 of aircraft 10 from cabin 18 of aircraft 10 as discussed earlier. First opening 38 of first rail track 34 is positioned in this example within flight deck 16 and second opening 48 is also positioned within flight deck 16. With this configuration, door panel 22 swings open into flight deck 16 with a decompression event originating in flight deck 16 as will be discussed in more detail. In this example, door assembly 20, as seen in FIGS. 2-4, includes opening (not shown) positioned within door panel 22 with second door panel 74 hinged to door panel 22 with hinge assembly 76, as seen in FIG. 2. Second door panel 74 includes handle 78 and locking assembly 80 positioned within flight deck 16. Locking assembly 80 includes, in this example, solenoids 82, as seen in FIG. 2, which have actuators 84 such that in an extended position as seen in FIG. 2, actuators block second door panel 74 from swinging open toward flight deck 16. Other common types of locking assemblies 80 can be employed which utilize a lock which moves a member into and out of blocking relationship with door panel 74. In this example, flight personnel can activate solenoids 82 so as to remove actuators 84 from a blocking position to a non-blocking position such that flight personnel can open second door panel 74 and access opening (not shown) and have ingress and egress from flight deck 16 should door panel 22 become jammed.

Figure 8:
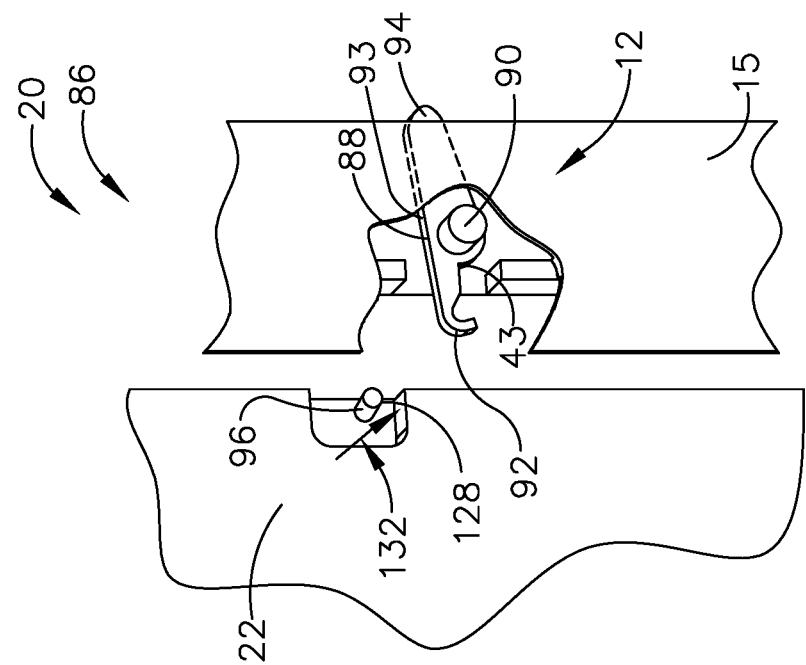
FIG. 8 is the view of FIG. 7 wherein the door panel is swinging open such as shown in FIG. 4 with a locking bracket of the door panel having slid out of engagement with the deadbolt in the first position of FIG. 7.
Figure 7:
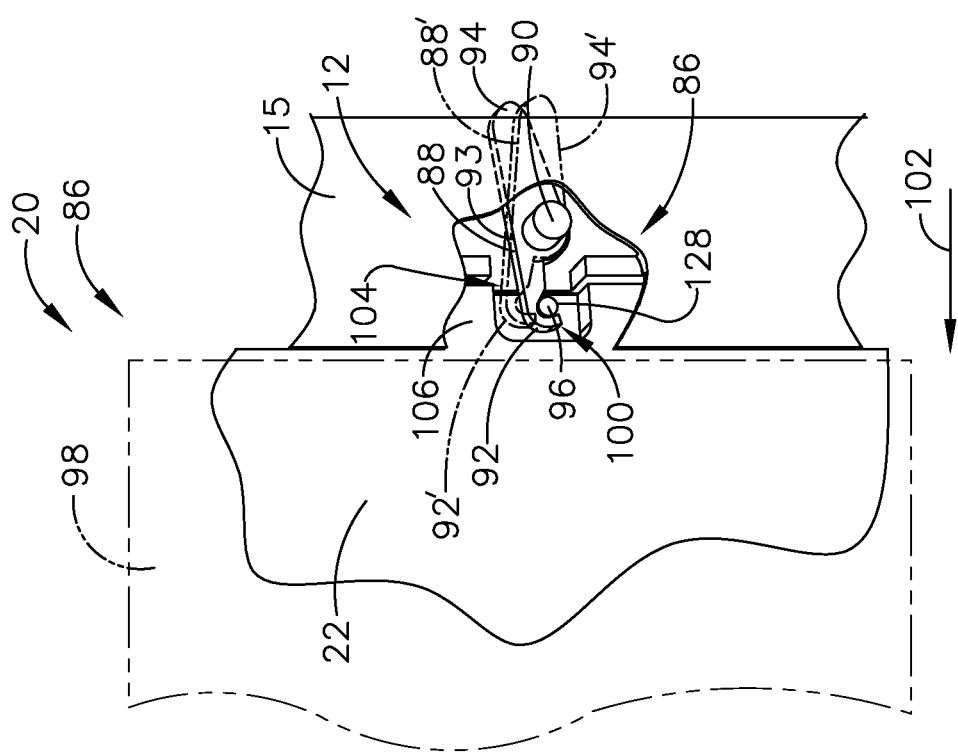
FIG. 7 is a partially broken away view of a first embodiment of a locking mechanism wherein a deadbolt is rotatably connected to a wall and in a first position is in a blocking relationship with respect to a locking bracket secured to a door panel preventing the door panel from sliding to an open position and in a second position is in a non-blocking relationship with respect to the locking bracket permitting the door panel to slide to an open position.

First locking mechanism 86, as seen in FIGS. 4, 7 and 8, associated with door assembly 20 includes deadbolt 88 having curved configuration 92 and opposing end 93 and opposing end 93 of deadbolt 88 is, in this example, connected to pin 90. Handle 94, in this example is part of deadbolt 88 extending from opposing end 93 such that rotating handle 94 on pivot or pin 90 also rotates curved configuration 92 of deadbolt 88. Further, first locking mechanism 86 includes locking bracket 96 which extends from door panel 22 in an angular direction, in this example perpendicular, from plane 98 (shown as dashed rectangular representation) of door panel 22. With door panel 22 in a closed position, as seen in FIGS. 3 and 7 relative to opening 32, as seen in FIG. 2, deadbolt 88 is in first position 100, as seen in FIG. 7. In first position 100, locking bracket 96 is positioned extending through curved configuration 92. In this arrangement, curved configuration 92 is in blocking relationship with respect to locking bracket 96 preventing door panel 22 from movement in direction 102 along plane 98 (shown as dashed rectangular representation) of door panel 22.

With deadbolt 88 rotated by handle 94 to second position 104, as seen in FIG. 7, shown as deadbolt 88' (in phantom) with curved portion 92' (in phantom) with handle 94' (in phantom). The rotation of handle 94 rotates deadbolt 88 and curved configuration 92 to second position 104 such that curved configuration 92' is not in a blocking relationship with respect to locking bracket 96 permitting door panel 22 to be moved in direction 102 along plane 98 of door panel 22.

With deadbolt 88 of first locking mechanism 86 in first position 100, as seen in FIG. 7, door panel 22 is blocked from sliding along first and second rail tracks 34, 44 as a pocket door arrangement within aircraft 10. With rotation of handle 94 by personnel within flight deck 16 to second position 104, as seen in FIG. 7, door panel 22 can be slid into an open position. Thus, operation of door panel 22 as a pocket door for ingress and egress with respect to flight deck 16 is controlled within flight deck 16 with operation of handle 94.

As will be described herein, with door panel 22 in a closed position further securement and control of door panel 22 is provided so as to further secure door panel 22 in the closed position in a direction transverse with respect to door panel 22 and to control door panel 22 for being permitted to swing open, from the closed position, into flight deck 16 as seen in FIG. 4. Permitting door panel to swing into an open position into flight deck 16 will occur, as will be described below in this example, upon sensing of an air pressure drop from a decompression event with respect to flight deck 16 and with the pressure forces generated from the decompression event swinging door panel 22 toward flight deck 16 to an open position.

With door panel 22 positioned in a closed position as seen in FIG. 3, relative to opening 32 and with blocking plate 60 secured to second bracket 58 with second bracket 58 in first position 64, blocking plate 60 extends: in overlying relationship to at least a portion 106 of door panel 22, as seen in FIG. 3; in overlying relationship to first opening 38 blocking first bearing 42 of first pair of bearings 24 from moving through first opening 38 and in overlying relationship to second opening 48 blocking first bearing 52 of second pair of bearings 28 from moving through second opening 48.

As mentioned earlier, first and second brackets 56, 58 are rotatably secured to one another. First bracket 56 and second bracket 58 of hinge blocking assembly 54 extends along opening 32 in direction 108, as seen in FIG. 3, transverse to direction 110, in which first rail track 34 extends and direction 110 in which second rail track 44 extends.

Door assembly 20, further includes solenoid 112 connected to wall 12, as seen in FIG. 5. With actuator 114 of solenoid 112 in first position 116, second bracket 58 is blocked from moving away from first position 64. Blocking plate 60 is blocked from moving away from overlying relationship to at least a portion 106 of door panel 22, blocking plate 60 is blocked from moving away from overlying relationship to first opening 38 blocking first bearing 42 of first pair of bearings 24 from moving through first opening 38 and blocking plate 60 is blocked from moving away from overlying relationship to second opening 48 blocking first bearing 52 of second pair of bearings 28 from moving through second opening 48. With actuator 114 of solenoid 112 in a second position 120, as seen in FIG. 6, second bracket 58 is not blocked from moving away from first position 64 and blocking plate 60 is not blocked from moving away from the at least a portion 106 of door panel 22, first opening 38 and second opening 48. In this example, lock bracket 118 is secured to blocking plate 60 and with actuator 114 in first position 116 actuator 114 is positioned against lock bracket 118 blocking and preventing blocking plate 60 from moving as discussed above and preventing second bracket 58 from moving from first position 64 to second position 66 as seen in FIGS. 4 and 6. With actuator 114 in second position 120, as seen in FIG. 6, actuator 114 is no longer positioned against lock bracket 118 and does not provide resistance to lock bracket 118 such that lock bracket 118 and blocking plate 60 are permitted to move as well as permitting second bracket 58 to move from first position 64, as seen in FIG. 5, to second position 66, as seen in FIG. 6, permitting door panel 22 to swing to an open position.

Operation of actuator 114 by solenoid 112 between first position 116 and second position 120 is controlled by air pressure sensor 122 connected to solenoid 112. In first position 116, door panel 22 operates as a pocket door being able to slide between open and closed positions permitting ingress and egress with respect to authorized personnel and flight deck 16. With actuator 114 of solenoid 112 in second position 120, so positioned by instruction from air pressure sensor 122 that a decompression event has occurred, door panel 22 is permitted to swing to an open position into flight deck 16 urged by the force of the air pressure differential between cabin 18 and flight deck 16.

With air pressure sensor 122 sensing an occurrence of a decompression event, sensor 122 activates solenoid 112 such that actuator 114 is positioned into second or retracted position 120. With a force from a decompression event applied in direction 124, as seen in FIGS. 4 and 6, transverse to door panel 22, the at least a portion 106 of door panel 22, the at least one of the first bearing 42 of first pair of bearings 24 and first bearing 52 of second pair of bearings 28 push blocking plate 60 and move second bracket 58 of the at least one hinge blocking assembly 54 out of first position 64 to second position 66 and at least a portion 106 of door panel 22 moves blocking plate 60 away from overlying relationship with door panel 22 and away from overlying relationship from first opening 38 and second opening 48 allowing: locking bracket 96 of door panel 22 to move relative to deadbolt 88 resulting in deadbolt 88 not being in blocking relationship with locking bracket 96, as seen in FIG. 8, wherein locking bracket 96 slides out of engagement with deadbolt 88. In addition, door panel 22 rotates relative to wall 12 about second bearing 68 aligned with first rail track 34 of first pair of bearings 24 and about second bearing 52 aligned with second rail track 44 of second pair of bearings 28, as seen in FIG. 4. With door panel 22 swinging open, opening 32 provides a flow path for air flow based on a flight deck 16 decompression event.

Second locking mechanism 86' is associated with door assembly 20, as seen in FIGS. 9 and 10, which can be employed alternatively to use of first locking mechanism 86 discussed above. The numbering for second mechanism 86' will be similar to that of first locking mechanism 86 where components are similar to both. Second locking mechanism 86' includes deadbolt 88 having curved configuration 92 and an opposing end 93 and deadbolt 88 is rotatably connected to door panel 22. Deadbolt 88 is rotatably connected to door panel 22 with opposing end 93 mounted to pin (not shown) associated with door panel 22. Handle 95 is mounted to pin (not shown) such that with the rotation of handle 95 deadbolt 88, curved configuration 92 and opposing end 93 are rotated by the pin.

Second locking mechanism 86' further includes locking bracket 96 which extends from blocking plate 60 wherein blocking plate 60, as described earlier, is secured to second bracket 58. Locking bracket 96 extends in an angular direction, in this example perpendicular, from plane 127, (indicated by dashed enclosure), of blocking plate 60 such that with door panel 22 in a closed position, as seen in FIGS. 3 and 9, relative to opening 32, as seen in FIG. 2, and with second bracket 58 and blocking plate 60 in first position 64, as seen in FIGS. 3 and 9, locking bracket 96 extends through curved configuration 92 of deadbolt 88, with deadbolt 88 in first position 125, such that locking bracket 96 is in blocking relationship to deadbolt 88. As a result, door panel 22 is blocked from movement in direction 102 along plane 98 of door panel 22, as seen in FIG. 9. With deadbolt 88 rotated into second position 126, as shown in FIG. 9 as deadbolt 88' (in phantom) with curved portion 92' (in phantom) by handle 95 shown (in phantom) as handle 95' in FIG. 9. Handle 95 rotated the pin which in turn rotated deadbolt 88 and curved configuration 92 to second position 126 so as to position curved configuration 92' of deadbolt 88' to not be in a blocking relationship with respect to locking bracket 96, permitting door panel 22 to be moved in direction 102 along plane 98 of door panel 22.

With deadbolt 88 of second locking mechanism 86' in first position 125, as seen in FIG. 9, door panel 22 is blocked from sliding along first and second rail tracks 34, 44 and operating as a pocket door within aircraft. 10. With rotation of handle 95 by authorized personnel within flight deck 16 to second position 126, as seen in FIG. 9, door panel 22 can be slid to an open position. Thus, operation of door panel 22 as a pocket door for ingress and egress with respect to flight deck 16 is controlled within flight deck 16 with operation of handle 95.

As will be discussed herein, with door panel 22 in a closed position further securement and control of door panel 22 is provided so as to secure door panel 22 in a closed position in a transverse direction with respect to door panel 22 and to control door panel 22 with respect to door panel 22 being permitted to swing into an open position into flight deck 16 as seen in FIG. 4. Permitting door panel 22 to swing an open position into flight deck 16 will occur, as will be described below in this example, upon sensing of an air pressure drop from a decompression event with respect to flight deck 16.

With door panel 22 positioned in a closed position as seen for example in FIG. 3, second bracket 58 is in a first position 64 as also seen in FIG. 3. With second bracket 58 in first position 64 with second bracket 58 secured to blocking plate 60, blocking plate 60 extends in overlying relationship to at least portion 106 of door panel 22 as shown in FIG. 4. This arrangement of blocking plate 60 overlying at least a portion 106 of door panel 22 provides additional support for door panel 22 in a transverse direction relative to door panel 22 in a closed position during normal pocket door operation of door panel 22. First bracket 56 and second bracket 58 of hinge blocking assembly 54, wherein second bracket 58 carries blocking plate 60, extends along opening 32 in direction 108, as seen in FIG. 3, transverse to direction 110, in which first rail track 34 extends and direction 110 in which second rail track 44 extends.

Further included with respect to use if second locking mechanism 86' is solenoid 112, as described earlier, wherein solenoid 112 is connected to wall 12, as seen in FIG. 5, with actuator 114 of solenoid 112 in first position 116 second bracket 58 and blocking plate 60 are blocked from moving away from first position 64. Actuator 114 in first position 116 is positioned against lock bracket 118, which is secured to blocking plate 60. As a result, second bracket 58 and blocking plate 60, which is secured to second bracket 58, are blocked from moving from first position 64. First position 116 for actuator 114 is the operating position wherein door panel 22 operates as a pocket door being able to slide between open and closed positions. As seen in FIG. 6, with actuator 114 of solenoid 112 in second or retracted position 120, actuator 114 is no longer blocking movement of lock bracket 118 which is connected to blocking plate 60 and blocking plate 60 is connected to second bracket 58, thereby second bracket 58 and blocking plate 60 are not blocked from moving from first position 64. Actuator 114 positioned in second position 120 permits door panel 22 to swing to an open position, which is controlled by air pressure sensor 122 connected to solenoid 112.

With solenoid 112 having received a signal from air pressure sensor 122 as a result of sensing a decompression event has occurred in flight deck 16, solenoid 112 will retract actuator 114 to second or retracted position 120 as seen in FIG. 6. With actuator 114 in the second or retracted position 120 and a force, generated in direction 124 from the decompression event as seen in FIGS. 4 and 6, is applied in a direction transverse to plane 98 of door panel 22, at least one of first bearing 42 of first pair of bearings 24 and first bearing 52 of second pair of bearings 28 are pushed against blocking plate 60 and at least a portion 106 of door panel 22 moves blocking plate 60 away from overlying relationship to door panel 22 and move second bracket 58 and blocking plate 60 of the at least one hinge blocking assembly 54 out of first position 64 to second position 66 as seen in FIGS. 5 and 6.

The moving of second bracket 58 in this example from first position 64 to second position 66 allows locking bracket 96 of blocking plate 60, as seen in FIG. 10, to move relative to deadbolt 88 resulting in locking bracket 96 not being in blocking relationship to deadbolt 88, where locking bracket 96 slides out of engagement with deadbolt 88, as seen in FIG. 10. In addition, door panel 22 rotates relative to wall 12 about second bearing 68 aligned with first rail track 34 of first pair of bearings 24 and about second bearing 70 aligned with second rail track 44 of second pair of bearings 28 such as seen in FIG. 4. With door panel 22 swinging open, opening 32 provides a flow path for air flow based on a flight deck 16 decompression event.

Locking mechanism such as first locking mechanism 86, as seen in FIGS. 7 and 8, for door panel 22 to be positioned within and out of blocking relationship with opening 32 defined by wall 12 includes deadbolt 88 having curved configuration 92 with deadbolt 88 rotatably connected to wall 12. First locking mechanism 86 further includes locking bracket 96 connected to door panel 22 wherein locking bracket 96 extends from door panel 22 in an angular direction, in this example, in a perpendicular direction with respect to plane 98 of door panel 22. Locking bracket 96 extends to distal end 128 of locking bracket 96 positioned spaced apart from door panel 22. With door panel 22 in a closed position relative to opening 32, as seen for example in FIG. 3, and deadbolt 88 in first position 100, as seen in FIG. 7, locking bracket 96 is positioned extending through curved configuration 92 of deadbolt 88. Deadbolt 88 is in blocking relationship with locking bracket 96 blocking door panel 22 in moving in direction 102 along plane 98 of door panel 22 and deadbolt 88 is not in blocking relationship with locking bracket 96 in direction 132, as shown for example in FIG. 8, along locking bracket 96. With door panel 22 in the closed position relative to the opening 32, as seen in FIG. 3 for example, and deadbolt 88 in second position 104, as seen in FIG. 7, deadbolt 88' (in phantom) is not in blocking relationship with locking bracket 96 permitting door panel 22 to move in direction 102 along plane 98 of door panel 22.

First locking mechanism 86 further includes first pair of bearings 24 secured to and positioned spaced apart along top portion 26 of door panel 22 and second pair of bearings 28 secured to and positioned spaced apart along bottom portion 30 of door panel 22, as seen in FIG. 3. First rail track 34 extends along first end portion or top portion 36 of opening 32 with first opening 38 defined by first rail track 34 positioned on first side 40 of first rail track 34, such that with first pair of bearings 24 aligned with first rail track 34 and door panel 22 in a closed position relative to the opening 32 first bearing 42 of first pair of bearings 24 is aligned with first opening 38. Second rail track 44 extends along second end portion or bottom portion 46 of opening 32 with second opening 48 defined by second tail track 44 positioned on first side 50 of second rail track 44, such that with second pair of bearings 28 aligned with second rail track 44 and door panel 22 in a closed position, as seen in FIG. 3, relative to opening 32 first bearing 52 of second pair of bearings 28 is aligned with second opening 48.

With a force applied in direction 124, as seen in FIGS. 4 and 6, in a direction transverse to plane 98 of door panel 22, door panel 22 rotates relative to wall 12. Rotation takes place about second bearing 68 of first pair of bearings 24 positioned aligned with first rail track 34 and second bearing 70 of second pair of bearings 28 positioned aligned with second rail track 44, as seen in FIG. 4. First bearing 42 of first pair of bearings 24 moves through first opening 38, first bearing 52 of second pair of bearings 28 moves through second opening 48 and locking bracket 96 moves and in this example slides relative to deadbolt 88, as seen in FIG. 8, such that locking bracket 96 is out of blocking relationship with deadbolt 88.

Another locking mechanism or second locking mechanism 86', as seen in FIGS. 9 and 10, for door panel 22 to be positioned within and out of blocking relationship with opening 32 defined by wall 12 includes deadbolt 88. Deadbolt 88 includes curved configuration 92 and deadbolt 88 is rotatably connected to door panel 22. Second locking mechanism 86' further includes at least one hinge blocking assembly 54 which includes first bracket 56 connected to wall 12 and second bracket 58 rotatably mounted to first bracket 56 about fixed axis of rotation 62 defined by the at least one hinge blocking assembly 54, as seen in FIG. 2. Locking bracket 96, as seen in FIGS. 9 and 10, is connected to blocking plate 60 wherein blocking plate 60 is connected to second bracket 58 as discussed earlier. Locking bracket 96 extends from blocking plate 60 in angular direction, in this example perpendicular, relative to plane 127 of blocking plate 60 to distal end 128 spaced apart from blocking plate 60. With door panel 22 in a closed position relative to opening 32 of wall 12 and second bracket 58 and blocking plate 60 positioned in first position 64 with blocking plate overlying at least a portion 106 of door panel 22 and with deadbolt 88 positioned in first position 125, locking bracket 96 extends through curved configuration 92 of deadbolt 88. Locking bracket 96 is in blocking relationship to deadbolt 88 and blocks movement of door panel 22 in direction 102 along plane 98 of door panel 22. Locking bracket 96 and deadbolt 88 are not in blocking relationship in direction 134 along locking bracket 96. With door panel 22 in closed position relative to opening 32 and deadbolt 88' in second position 126 deadbolt 88' is not in blocking relationship with locking bracket 96 permitting door panel 22 to move in direction 102 along plane 98 of door panel 22.

With second bracket 58 and blocking plate 60 removed from first position 64 into second position 66, as discussed earlier, locking bracket 96 is removed from extending through deadbolt 88, as seen in FIG. 10. At the same time blocking plate 60 is moved out of blocking relationship with respect to door panel 22 permitting door panel 22 swing open as shown in FIG. 4 and described above.

Second locking mechanism 86' further includes first pair of bearings 24 secured to and positioned spaced apart along top portion 26 of door panel 22 and second pair of bearings 28 secured to and positioned spaced apart along bottom portion 30 of door panel 22, as discussed earlier. First rail track 34 extends along first end portion 36 of opening 32 with first opening 38 defined by first rail track 34 positioned on first side 40 of first rail track 34, such that with first pair of bearings 24 aligned with first rail track 34 and door panel 22 in a closed position relative to opening 32 first bearing 42 of first pair of bearings 24 is aligned with first opening 38. Second rail track 44 extends along second end or bottom portion 46 of opening 32 with second opening 48 defined by second tail track 44 positioned on first side 50 of second rail track 44, such that with second pair of bearings 28 aligned with second rail track 44 and door panel 22 in a closed position relative to opening 32 first bearing 52 of second pair of bearings 28 is aligned with second opening 48. With force applied in direction 124, as a result of a decompression event, transverse to plane 98 of door panel 22, door panel 22 rotates relative to wall 12 about second bearing 68 of first pair of bearings 23 positioned aligned with first rail track 34 and second bearing 70 of second pair of bearings 28 positioned aligned with second rail track 44.

While various embodiments have been described above, this disclosure is not intended to be limited thereto. Variations can be made to the disclosed embodiments that are still within the scope of the appended claims.

What is claimed:

1. A door assembly, comprising:
    a door panel having a first pair of bearings secured to and positioned spaced apart along a top portion of the door panel and a second pair of bearings secured to and positioned spaced apart along a bottom portion of the door panel;
    a wall having an opening which extends through the wall wherein:
        a first rail track extends along a first end portion of the opening with a first opening defined by the first rail track positioned on a first side of the first rail track, such that with the first pair of bearings aligned with the first rail track and the door panel in a closed position relative to the opening a first bearing of the first pair of bearings is aligned with the first opening; and
        second rail track extends along a second end portion of the opening with a second opening defined by the second rail track positioned on a first side of the second rail track, such that with the second pair of bearings aligned with the second rail track and the door panel in a closed position relative to the opening a first bearing of the second pair of bearings is aligned with the second opening; and
    at least one hinge blocking assembly comprises a first bracket connected to the wall and a second bracket wherein the second bracket is rotatably mounted to the first bracket about a fixed axis of rotation defined by the at least one hinge blocking assembly wherein with the second bracket in a first position the second bracket extends away from the first bracket.

2. The door assembly of claim 1, wherein the wall is positioned within a fuselage of an aircraft separating a flight deck portion of the aircraft from a cabin portion of the aircraft.

3. The door assembly of claim 2, wherein:
    the first opening and the second opening are positioned within the flight deck; and
    the second bracket is secured to a blocking plate and with the second bracket in the first position the blocking plate extends across at least one of:
        the first opening in blocking relationship to the first bearing of the first pair of bearings with respect to the first opening with the door panel in the closed position relative to the opening; and
        the second opening in blocking relationship to the first bearing of the second pair of bearings with respect to the second opening with the door panel in the closed position relative to the opening.

4. The door assembly of claim 2, wherein the door panel further includes an opening positioned within the door panel with a second door panel hinged to the door panel such that second door panel is positioned to move between an open and a closed position with respect to the opening within the door panel.

5. The door assembly of claim 4, wherein the second door panel includes a handle positioned within the flight deck.

6. The door assembly of claim 1, further including a first locking mechanism associated with the door assembly which includes:
    a deadbolt comprises a curved configuration and the deadbolt is rotatably connected to the wall; and a locking bracket which extends from the door panel in an angular direction from a plane of the door panel, such that with the door panel in the closed position relative to the opening the deadbolt is in a first position with the locking bracket positioned extending through the curved configuration such that the curved configuration is in blocking relationship with the locking bracket preventing the door panel from movement in a direction along a plane of the door panel and with the deadbolt rotated to a second position the curved configuration is not in a blocking relationship with the locking bracket permitting the door panel to be moved in a direction along the plane of the door panel.

7. The door assembly of claim 6, wherein with the door panel in the closed position relative to the opening and with a blocking plate secured to the second bracket with the second bracket in the first position, the blocking plate extends in overlying relationship to at least a portion of the door panel, in overlying relationship to the first opening blocking the first bearing of the first pair of bearings from moving through the first opening and in overlying relationship to the second opening blocking the first bearing of the second pair of bearings from moving through the second opening.

8. The door assembly of claim 7 wherein the first bracket and the second bracket of the at least one hinge blocking assembly extends along the opening in a direction transverse to a direction in which the first rail track extends and to the direction in which the second rail track extends.

9. The door assembly of claim 7, further included is a solenoid connected to the wall, wherein:
  with an actuator of the solenoid in a first position the second bracket is blocked from moving away from the first position, the blocking plate is blocked from moving away from overlying relationship to the at least a portion of the door panel, the blocking plate is blocked from moving away from overlying relationship to the first opening blocking the first bearing of the first pair of bearings from moving through the first opening and the blocking plate is blocked from moving away from overlying relationship to the second opening blocking the first bearing of the second pair of bearings from moving through the second opening;
  with the actuator of the solenoid in a second position the second bracket is not blocked from moving away from the first position and the blocking plate is not blocked from moving away from the at least a portion of the door panel, the first opening and the second opening; and
  the solenoid is connected to an air pressure sensor.

10. The door assembly of claim 9, wherein:
  with the air pressure sensor sensing an occurrence of a decompression event the air pressure sensor activates the solenoid such that the actuator is positioned into the second position;
  with a force from the decompression event applied in a direction transverse to the plane of the door panel, the at least a portion of the door panel, the at least one of the first bearing of the first pair of bearings and the first bearing of the second pair of bearings push the blocking plate and move the second bracket of the at least one hinge blocking assembly out of the first position to a second position and move the blocking plate away from overlying relationship to the at least portion of the door panel and away from overlying relationship from the first opening and the second opening allowing:
    the locking bracket of the door panel moves relative to the deadbolt resulting in the deadbolt not being in blocking relationship to the locking bracket; and
    the door panel rotates relative to the wall about a second bearing aligned with the first rail track of the first pair of bearings and about a second bearing aligned with the second rail track of the second pair of bearings.

11. The door assembly of claim 10, wherein with moving the second bracket of the at least one hinge blocking assembly out of the first position to a second position, the second bracket rotates relative to the first bracket by way of a knuckle assembly formed by the first and second brackets and having a pin inserted into the knuckle assembly.

12. The door assembly of claim 10, wherein the locking bracket of the door panel slides out of engagement with the deadbolt resulting in the deadbolt not being in blocking relationship to the locking bracket.

13. The door assembly of claim 10, wherein with the door panel rotating relative to the wall, the opening provides a flow path for airflow based on a flight deck decompression event.

14. The door assembly of claim 1, further including a second locking mechanism associated with the door assembly which includes:
  a deadbolt comprises a curved configuration and the deadbolt is rotatably connected to the door panel; and
  a locking bracket extends from a blocking plate secured to the second bracket, wherein the locking bracket extends in an angular direction from a plane of the blocking plate such that with the door panel in the closed position relative to the opening and with the second bracket in the first position, the locking bracket extends through the curved configuration of the deadbolt with the deadbolt in a first position, such that the locking bracket is in blocking relationship to the deadbolt and the door panel is blocked from movement in a direction along a plane of the door panel and with the deadbolt rotated into a second position the locking bracket is not in a blocking relationship with the curved configuration of the deadbolt permitting the door panel to be moved in the direction along the plane of the door panel.

15. The door assembly of claim 14, wherein with the second bracket in the first position, the blocking plate extends in overlying relationship to at least a portion of the door panel.

16. The door assembly of claim 15 wherein the first bracket and second bracket of the at least one hinge blocking assembly extends along the opening in a direction transverse to a direction in which the first rail track extends and to the direction in which the second rail track extends.

17. The door assembly of claim 14, further included is a solenoid connected to the wall, wherein:
  with an actuator of the solenoid in a first position the second bracket is blocked from moving away from the first position, the blocking plate is blocked from moving away from overlying relationship to the at least a portion of the door panel, the blocking plate is blocked from moving away from overlying relationship to the first opening blocking the first bearing of the first pair of bearings from moving through the first opening and the blocking plate is blocked from moving away from overlying relationship to the second opening blocking the first bearing of the second pair of bearings from moving through the second opening;

with the actuator of the solenoid in a second position the second bracket is not blocked from moving away from the first position and the blocking plate is not blocked from moving away from the at least a portion of the door panel, the first opening and the second opening; and the solenoid is connected to an air pressure sensor.

18. The door assembly of claim 17, wherein:

with the air pressure sensor sensing an occurrence of a decompression event the air pressure sensor activates the solenoid such that the actuator is positioned into the second position;

with a force from the decompression event applied in a direction transverse to the plane of the door panel, the at least a portion of the door panel, the at least one of the first bearing of the first pair of bearings and the first bearing of the second pair of bearings push the blocking plate and move the second bracket of the at least one hinge blocking assembly out of the first position to a second position and move the blocking plate away from overlying relationship to the at least a portion of the door panel and away from overlying relationship from the first opening and the second opening allowing:

the locking bracket of the second bracket to move relative to the deadbolt resulting in the deadbolt not being in blocking relationship to the locking bracket; and the door panel rotates relative to the wall about a second bearing aligned with the first rail track of the first pair of bearings and about a second bearing aligned with the second rail track of the second pair of bearings.

19. The door assembly of claim 18, wherein the locking bracket of the second bracket slides out of engagement with the deadbolt resulting in deadbolt not being in blocking relationship to the locking bracket.

20. The door assembly of claim 18, wherein with the door panel rotating relative to the wall, the opening provides a flow path for airflow based on a flight deck decompression event.

* * * * *

UNITED STATES PATENT AND TRADEMARK OFFICE
CERTIFICATE OF CORRECTION

PATENT NO. : 10,661,881 B2
APPLICATION NO. : 15/810631
DATED : May 26, 2020
INVENTOR(S) : Timothy P. Gallagher, Jr. et al.

Page 1 of 1

It is certified that error appears in the above-identified patent and that said Letters Patent is hereby corrected as shown below:

In the Claims

At Column 13, Line 65, "least portion" should be -- least a portion --.

At Column 14, Line 22, "airflow" should be -- air flow --.

At Column 16, Line 19, "airflow" should be -- air flow --.

Signed and Sealed this
First Day of September, 2020

Andrei Iancu
*Director of the United States Patent and Trademark Office*